United States Patent

Soceanu et al.

(10) Patent No.: US 10,242,087 B2
(45) Date of Patent: *Mar. 26, 2019

(54) CLUSTER EVALUATION IN UNSUPERVISED LEARNING OF CONTINUOUS DATA

(71) Applicant: International Business Machines Corporation, Armonk, NY (US)

(72) Inventors: Omri Soceanu, Haifa (IL); Lev Greenberg, Haifa (IL); Allon Adir, Kiryat Tivon (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/593,859

(22) Filed: May 12, 2017

(65) Prior Publication Data

US 2018/0329977 A1 Nov. 15, 2018

(51) Int. Cl.
*G06F 17/30* (2006.01)
*G06F 17/18* (2006.01)
*G06N 99/00* (2019.01)

(52) U.S. Cl.
CPC ........ *G06F 17/30598* (2013.01); *G06F 17/18* (2013.01); *G06N 99/005* (2013.01)

(58) Field of Classification Search
CPC combination set(s) only.
See application file for complete search history.

(56) References Cited

U.S. PATENT DOCUMENTS

| 8,037,010 | B2 | 10/2011 | Jaros et al. |
| 9,230,216 | B2 | 1/2016 | Bart et al. |
| 9,342,579 | B2 | 5/2016 | Cao et al. |
| 2004/0236604 | A1 | 11/2004 | McNair |
| 2005/0089878 | A1* | 4/2005 | Debe .................. G06F 19/18 435/6.14 |
| 2005/0105775 | A1 | 5/2005 | Luo et al. |
| 2007/0239554 | A1* | 10/2007 | Lin .................. G06F 17/30867 705/26.7 |
| 2007/0260586 | A1 | 11/2007 | Savona et al. |
| 2009/0082997 | A1 | 3/2009 | Tokman et al. |
| 2016/0239857 | A1 | 8/2016 | Milton et al. |
| 2017/0019308 | A1 | 1/2017 | Rapoport et al. |
| 2017/0344706 | A1* | 11/2017 | Torres .................. A61B 5/11 |
| 2018/0047553 | A1* | 2/2018 | Richardson .......... A61B 17/00 |

FOREIGN PATENT DOCUMENTS

EP 2897088 A1 7/2015

OTHER PUBLICATIONS

Piovesan et al., "Data Analytics for Smart Parking Applications", Sensors, MDPI, Published: Sep. 23, 2016, doi:10.3390/s16101575, 25 pages.

(Continued)

*Primary Examiner* — Shyue Jiunn Hwa
(74) *Attorney, Agent, or Firm* — Stosch Sabo

(57) ABSTRACT

A data manager determines an appropriate number of clusters for continuous data using unsupervised learning. The data manager selects an appropriate number of clusters based on at least one temporal stability measure between continuous data from at least two time intervals.

19 Claims, 6 Drawing Sheets

(56) References Cited

OTHER PUBLICATIONS

List of IBM Patents or Patent Applications Treated as Related, dated Dec. 20, 2017, 2 pages.
Soceanu et al., "Cluster Evaluation in Unsupervised Learning of Continuous Data," U.S. Appl. No. 15/849,725, filed Dec. 21, 2017.
Accelerated Examination Support Document, dated Dec. 20, 2017, 27 pages.
Kisilevich et al., "Spatio-Temporal Clustering: a Survey", Technical Report, ISTI-CNR, Italy. Submitted to Data Mining and Knowledge Discovery Handbook, Springer. 22 pages.
Pravilovic et al., "Application of Spatio-Temporal Clustering in Forecasting Optimization of Geo-Referenced Time Series", American Journal of Modeling and Optimization, 2014. vol. 2, No. 1, 8-15. Science and Education Publishing, DOI: 10.12691/ajmo-2-1-2. 8 pages.
Yang et al., "Temporal Data Clustering Via Weighted Clustering Ensemble with Different Representations", IEEE Transactions on Knowledge and Data Engineering, vol. 23 No. 2, Feb. 2011. 14 pages.
Yasodha et al., "A Survey on Temporal Data Clustering", International Journal of Advanced Research in Computer and Communication Engineering, vol. 1, Issue 9, Nov. 2012. 5 pages.
Maulik et al., "Performance Evaluation of Some Clustering Algorithms and Validity Indices", IEEE Transactions on Pattern Analysis and Machine Intelligence, vol. 24, No. 12, Dec. 2002. 5 pages.
Davies et al., "A Cluster Separation Measure", IEEE Transactions on Pattern Analysis and Machine Intelligence, vol. PAMI-1, No. 2, Apr. 1979. 4 pages.
Dunn, "A Fuzzy Relative of the ISODATA Process and Its Use in Detecting Compact Well-Separated Clusters", Journal of Cybernetics, vol. 3, Issue 3, 1973. http://www.tandfonline.com/doi/abs/10.1080/01969727308546046 Last accessed May 11, 2017. 5 pages.
Rand, "Objective Criteria for the Evaluation of Clustering Methods", Journal of the American Statistical Association, vol. 66, No. 336. Dec. 1971. 6 pages.
Van Rijsbergen, "Information Retrieval", 2nd Edition, Department of Computing Science,University of Glasgow, 1979. 153 pages.
Gudmundsson et al., "Computing Longest Duration Flocks in Trajectory Data", ACM-GIS'06, Nov. 10-11, 2016. Arlington, VA. 8 pages.
Vieira et al., "On-line Discovery of Flock Patterns in Spatio-Temporal Data", Proceedings of the 17th ACM SIGSPATIAL International Conference of Advances in Geographic Information Systems, 2009. 18 pages.

\* cited by examiner

CLUSTER EVALUATION IN UNSUPERVISED LEARNING OF CONTINUOUS DATA

BACKGROUND

The present disclosure relates to data classification and evaluation, and, more specifically, to clustering continuous data.

SUMMARY

Aspects of the present disclosure are directed to a method comprising receiving a first set of data for a first time and a second set of data for a second time and clustering the first set of data into a first number of clusters. The method can further comprise determining a cross-cluster movement and an average normalized point movement based on the second set of data and the clustered first set of data. The method can further comprise determining the first number of clusters is an appropriate number of clusters based on the cross-cluster movement and the average normalized point movement between the first set of data and the second set of data.

Additional aspects of the present disclosure are directed toward a system including a data manager comprising a memory and a processor communicatively coupled to a user interface and at least one sensor. The data manager can be configured to receive at least a first set of sensor data for a first time and a second set of sensor data for a second time from the at least one sensor and determine an appropriate number of clusters for the sensor data based on a cross-cluster movement and an average normalized point movement between the first set of sensor data and the second set of sensor data. Cross-cluster movement can be based on changes in cluster classification for corresponding data points from the first set of sensor data and the second set of sensor data. The data manager can be further configured to cluster a new set of sensor data received from the at least one sensor according to the appropriate number of clusters. The data manager can be further configured to identify at least one anomalous behavior in the new set of sensor data and output an indication of the at least one anomalous behavior to the user interface.

Additional aspects of the present disclosure are directed toward a computer program product comprising a computer readable storage medium having program instructions embodied therewith. The program instructions can be executable by a processor to cause the processor to perform a method comprising receiving a first set of training log data for a first time and a second set of training log data for a second time and partitioning the first set of training log data into a plurality of clusters having a first number of clusters and a respective centroid corresponding to each cluster. Respective data points that are in a given cluster can be closer to a respective centroid of the given cluster than any other centroid of any other cluster. The method can further comprise determining a cross-cluster movement and an average normalized point movement based on the second set of training log data and the clustered first set of training log data. The method can further comprise determining the first number of clusters is an appropriate number of clusters based on the cross-cluster movement and the average normalized point movement between the first set of training log data and the second set of training log data. The method can further comprise clustering new log data according to the appropriate number of clusters.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
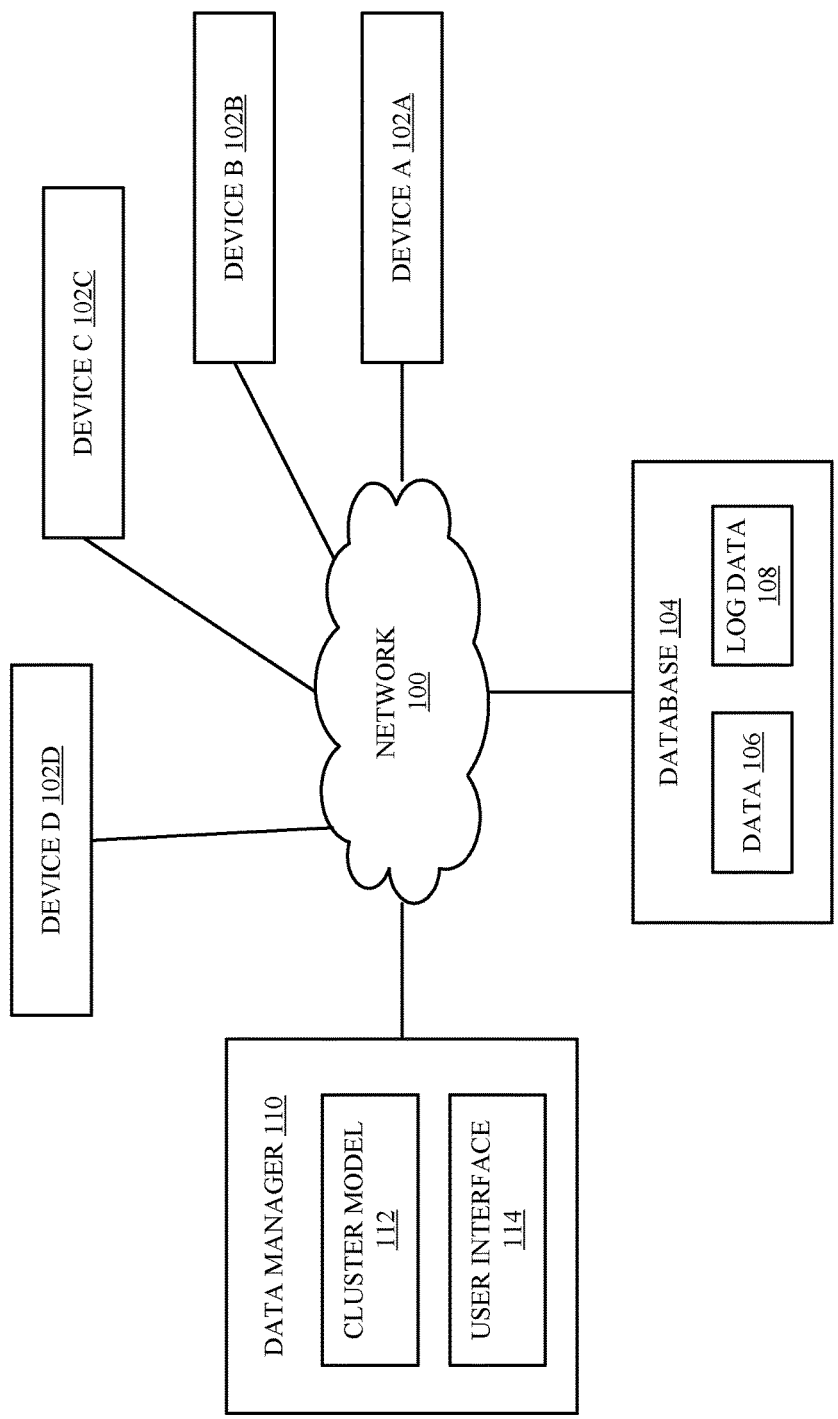
FIG. 1 illustrates a block diagram of an example network that can implement aspects of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward clustering continuous data. More particular aspects of the present disclosure are directed toward appropriately clustering data such that the clustered data exhibits temporal stability. Further aspects of the present disclosure are directed toward identifying anomalies in appropriately clustered data.

Aspects of the present disclosure can identify a beneficial number of clusters by clustering data for at least two consecutive time frames according to a variety of cluster models and identifying an acceptable cluster model based on one or more temporal stability measures. Aspects of the present disclosure advantageously overcome challenges associated with systems clustering data according to spatial metrics and/or systems clustering data based on data from a single time interval.

As will be appreciated by one skilled in the art, continuous data can be difficult to accurately cluster using available systems. An example challenge associated with continuous data is the inherent lack of partitions in the continuous data. Thus, it can be difficult to determine an appropriate amount of data to analyze at any given time. Another example challenge of continuous data is the difficulty in accurately identifying clusters from any single snapshot of continuous data. Thus, it can be difficult to differentiate between numerous static clusters in close proximity to one another from a single snapshot of data. Another example challenge of continuous data is the difficulty in accurately identifying clusters exhibiting static behavior and clusters exhibiting dynamic behavior in continuous data.

As is understood by one skilled in the art, continuous data can contain both static clusters of data and dynamic clusters of data. As an example of dynamic clusters, consider multiple flocks of birds with each flock corresponding to a cluster. Each flock moves as a group and can shift cluster boundaries over time. As an example of static clusters, consider a plurality of beehives with each beehive having a swarm of bees in its vicinity. In this case, a respective bee may move within a common area between any two timeframes while remaining within the vicinity of its respective beehive.

Continuous data exhibiting both static clusters and dynamic clusters can be difficult to characterize using available systems because spatial metrics associated with the continuous data may not be reliable indicators for static cluster behavior or dynamic cluster behavior. Aspects of the present disclosure advantageously utilize temporal metrics to accurately cluster continuous data so that the continuous data will exhibit consistent cluster quality over time. Accurate clustering of continuous data improves the accuracy of analyses performed on the clustered data. Thus, embodiments of the present disclosure improve the functioning of systems analyzing continuous data by improving the accuracy of the systems (e.g., reducing false positives).

Aspects of the present disclosure exhibit numerous advantages. First, aspects of the present disclosure identify an appropriate cluster model of continuous data based on temporal stability of the clusters. Thus, aspects of the present disclosure are less susceptible to the disadvantages associated with clustering data according to spatial metrics. For example, a cluster model generated according to aspects of the present disclosure exhibits consistent cluster quality over numerous periods of time, whereas a cluster model generated according to available systems may generate a cluster model optimized for a single period of data but which exhibits poor cluster quality when applied to other periods of corresponding data. Second, aspects of the present disclosure allow testing and analyzing of clustered data based on unsupervised learning of an appropriate clustering model. Thus, no prior knowledge or ground-truth samples are required to generate the model, thereby avoiding the cost and time associated with using supervised training. Third, aspects of the present disclosure can use two measures of temporal stability. Thus, aspects of the present disclosure exhibit improved accuracy (e.g., a reduction in false-positives). The aforementioned advantages are example advantages, and embodiments of the present disclosure exist that contain all, some, or none of the aforementioned advantages while remaining within the spirit and scope of the present disclosure.

As an illustrative example of one application of clustering continuous data, consider customers at a clothing store. Each customer is associated with an ideal set of clothing dimensions to fit their unique body shape and size. A retail store can sell clothes in various sizes such as small, medium, and large. The dimensions of the clothing in each size can be determined such that a majority of customers using a "small" shirt size will be able to fit in that shirt size despite small fluctuations in body size. In this example, the shirt sizes are similar to beehives, where each shirt size adequately fits a boundary of body shapes and sizes, and where most customers in a cluster (e.g., small) may fluctuate within the bounds of those size dimensions (e.g., their fluctuations in shape/size do not cause them to change sizes). Thus, a retail store could identify these clusters and modify the number of various dimensions of respective shirt sizes (e.g., small, medium, and large) to maximize fit to all the people within each cluster.

In contrast, another group of customers may experience larger fluctuations in body shape and size that causes them to transition between different sizes of clothing. For example, a group of customers may typically wear a size "small" in the summer and a size "medium" in the winter corresponding to changing diet and workout habits. This group of customers exhibits a dynamic cluster behavior because they transition between two clusters (e.g., small and medium) as a group. Thus, a retail store could identify this group and market a custom shirt to them (e.g., a shirt with dimensions between "small" and "medium", a flexible shirt, etc.).

As another example, a data science company could wish to monitor database accesses and identify abnormal behavior relating to database accesses. The data science company could monitor a plurality of users having access to one or more databases in order to retrieve and/or update information in the one or more databases. The plurality of users can be clustered into a plurality of groups according to typical database behavior. Some of these groups may exhibit static cluster behavior while others exhibit dynamic cluster behavior. For example, there may be three groups such that a first group uses the databases often, a second group uses the databases rarely, and a third group either rarely uses the databases or often uses the databases. For example, the first group could be database administrators, the second group could be a general set of users who occasionally retrieve information from the database, and the third group could be a project team that receives a particular project related to a particular database, and so uses the database heavily for a period of time, but otherwise rarely uses the database. The data science company could identify these three groups by clustering the set of users according to at least one temporal stability measure. In so doing, the data science company could reduce false-positives (e.g., the data science company could reduce the probability of identifying a behavior as anomalous when it is not anomalous) by identifying both static groups and dynamic groups of users. For example, aspects of the present disclosure can determine that a user's significant change in database behavior is not anomalous if the user's significant change in database behavior is consistent with a change in database behavior of the cluster to which the user belongs.

Although aspects of the present disclosure are described above with respect to retail and data science, aspects of the present disclosure are applicable to any number of applications. For example, aspects of the present disclosure can be useful in logistical applications. In such an example, a plurality of warehouses could generate continuous data comprising shipments of a plurality of products. Aspects of the present disclosure could appropriately cluster such continuous data and identify bottlenecks, abnormal order shipments, and/or other inefficiencies.

Likewise, aspects of the present disclosure can be useful in utility applications. For example, a plurality of components in a power grid could generate continuous data measuring electrical loads on various portions of a power grid. Aspects of the present disclosure can be used to cluster the continuous data in order to differentiate regular electrical load fluctuations from abnormal load fluctuations.

Likewise, aspects of the present disclosure can be useful in manufacturing applications. For example, continuous data can be generated for conforming and non-conforming manufactured products. Aspects of the present disclosure can be used to cluster the product conformance and non-conformance measures and differentiate between a normal number of non-conformances (e.g., resulting from a normal amount of user error) and an anomalous number of non-conformances (e.g., indicating a malfunctioning manufacturing machine).

Likewise, aspects of the present disclosure can be useful in marketing applications. For example, continuous data can be generated for customer profiles (e.g., clothing sizes, gender, age, location, etc.). The continuous data can be clustered according to aspects of the present disclosure and monitored to provide appropriate advertisements related to an appropriate selection of sufficiently stocked products most relevant to various customer groups over time (e.g., seasonally, throughout a day, etc.).

Likewise, aspects of the present disclosure can be useful in financial applications. For example, continuous data can be generated for individual stock trades, trading of sets of stocks (e.g., industry groups), and/or trades made throughout an entire stock market. Aspects of the present disclosure can appropriately cluster the continuous data in order to identify abnormal stock trading behavior. For example, aspects of the present disclosure may differentiate between normal volatility and a level of volatility indicating, for example, insider trading.

Likewise, aspects of the present disclosure can be useful in medical applications. For example, continuous data can be generated by monitoring any one or more of a patient's biological characteristics, such as, for example, pupil dilation, skin temperature, pulse rate, blood pressure, or other factors. Aspects of the present disclosure can cluster the data in order to differentiate between normal conditions and abnormal conditions. For example, aspects of the present disclosure could be used to identify a truthful statement from an untruthful statement during a lie detector test.

Likewise, aspects of the present disclosure can be useful in complex system monitoring. For example, continuous data can be generated by a plurality of similar and/or dissimilar sensors in a complex system, such as, but not limited to, an automobile, an aircraft, a marine craft, a space launch vehicle, or other complex systems containing a plurality of similar and/or dissimilar sensors. Aspects of the present disclosure can cluster the continuous sensor data to identify normal and abnormal operating conditions. For example, aspects of the present disclosure could identify a malfunctioning component of a complex system.

Referring now to the figures, FIG. 1 illustrates a block diagram of an example network in which some embodiments of the present disclosure can be implemented. The network 100 communicatively couples device A 102A, device B 102B, device C 102C, device D 102D (hereinafter referred to as devices 102A-D), database 104, and data manager 110 to one another via a physical or wireless connection. Although data manager 110 is shown as being communicatively coupled to devices 102A-102D and database 104 in FIG. 1, in some embodiments, data manager 110 can be stored in any one of devices 102A-102D. In some embodiments, both data manager 110 and database 104 are stored in any one of devices 102A-102D. Furthermore, although data manager 110 is shown as being communicatively coupled to devices 102A-102D and database 104, data manager 110 can likewise be connected to only database 104 or only one of devices 102A-102D.

Devices 102A-102D can be, but are not limited to, computers, laptops, workstations, cell phones, tablets, other user devices, or a combination of the aforementioned user devices. Although four user devices are shown, more or fewer user devices can be present. In some embodiments, there are hundreds or thousands of user devices.

In some embodiments, devices 102A-102D represent user profiles rather than physical devices. For example, device A 102A can represent a user A connecting to network 100 from any one or more of a plurality of physical devices using authorizations associated with a profile associated with user A.

Database 104 comprises data 106 and log data 108. Log data 108 can comprise continuous data generated by devices 102A-102D accessing data 106 in database 104. Data 106 can be, for example, tables storing the values that make up database 104. Log data 108 can be, but is not limited to, database access logs, transaction logs, event logs, message logs, server logs, operations logs (operlogs), or other data retrieved from a custom logger or standard logger (e.g., syslog). Although log data 108 is shown in database 104, in some embodiments, log data 108 is retrieved from any device associated with log data (e.g., retrieved directly from devices 102A-102D).

Data manager 110 stores cluster model 112 and user interface 114. User interface 114 can comprise any one or more of a monitor, a screen, a touch screen, a keyboard, a mouse, a microphone, a camera, and/or other input/output devices capable of receiving input from a user and presenting output to a user. Data manager 110 retrieves log data 108 from database 104 and/or continuous data generated by devices 102A-102D. Cluster model 112 can be generated using unsupervised learning and based on an appropriate number of clusters that satisfy an acceptable measure of temporal stability. User interface 114 can present information regarding cluster model 112 (e.g., an appropriate number of clusters or parameters associated with cluster model 112 such as, but not limited to, thresholds, cost functions, etc.). Data manager 110 is described in more detail hereinafter with respect to FIGS. 3 and 6. Cluster model 112 is described in more detail hereinafter with respect to FIGS. 4-5.

Figure 2:
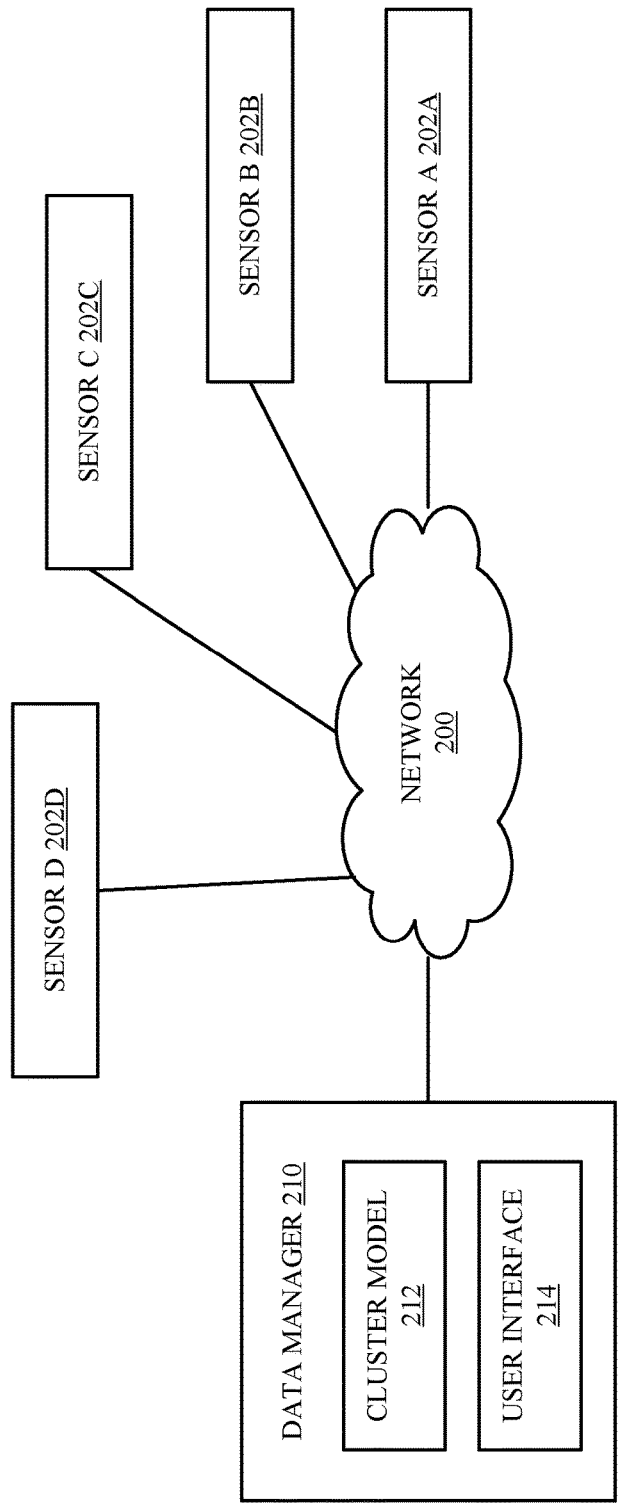
FIG. 2 illustrates a block diagram of another example network that can implement aspects of the present disclosure.

FIG. 2 illustrates a block diagram of another example network in which some embodiments of the present disclosure can be implemented. FIG. 2 comprises a network 200 communicatively coupling sensor A 202A, sensor B 202B, sensor C 202C, sensor D 202D (hereinafter collectively referred to as sensors 202A-202D), and data manager 210 via a physical or wireless network. Sensors 202A-202D can be any number of sensors capable of generating continuous data. For example, sensors 202A-202D can collect data such as, but not limited to, photographic data, video data, audio data, temperature data, weight/mass data, density data, composition data, velocity data, acceleration data, location data, log data, other data, or any combination of the aforementioned data. Thus, sensors 202A-202D can be, but are not limited to, cameras, video cameras, microphones, temperature sensors, gyroscopes, global positioning systems (GPS), accelerometers, position sensors, chemical composition sensors, pressure sensors, mass sensors, computer memories, computer processors, or other sensors.

Data manager 210 comprises cluster model 212 and user interface 214. Data manager 210 collects continuous data from sensors 202A-202D and generates an appropriate cluster model 212 using unsupervised learning and such that the cluster model contains clusters exhibiting an acceptable level of temporal stability. Data manager 210 can output results from cluster model 212 to user interface 214. For example, user interface 214 can exhibit an appropriate number of clusters based on the cluster model 212 and at least two sets of data from the sensors 202A-202D. As another example, user interface 214 can exhibit normal and abnormal data fluctuations from the continuous data received from sensors 202A-202D and clustered according to parameters of cluster model 212. Data manager 210 is described in more detail hereinafter with respect to FIGS. 3 and 6. Cluster model 212 is described in more detail hereinafter with respect to FIGS. 4-5.

Figure 3:
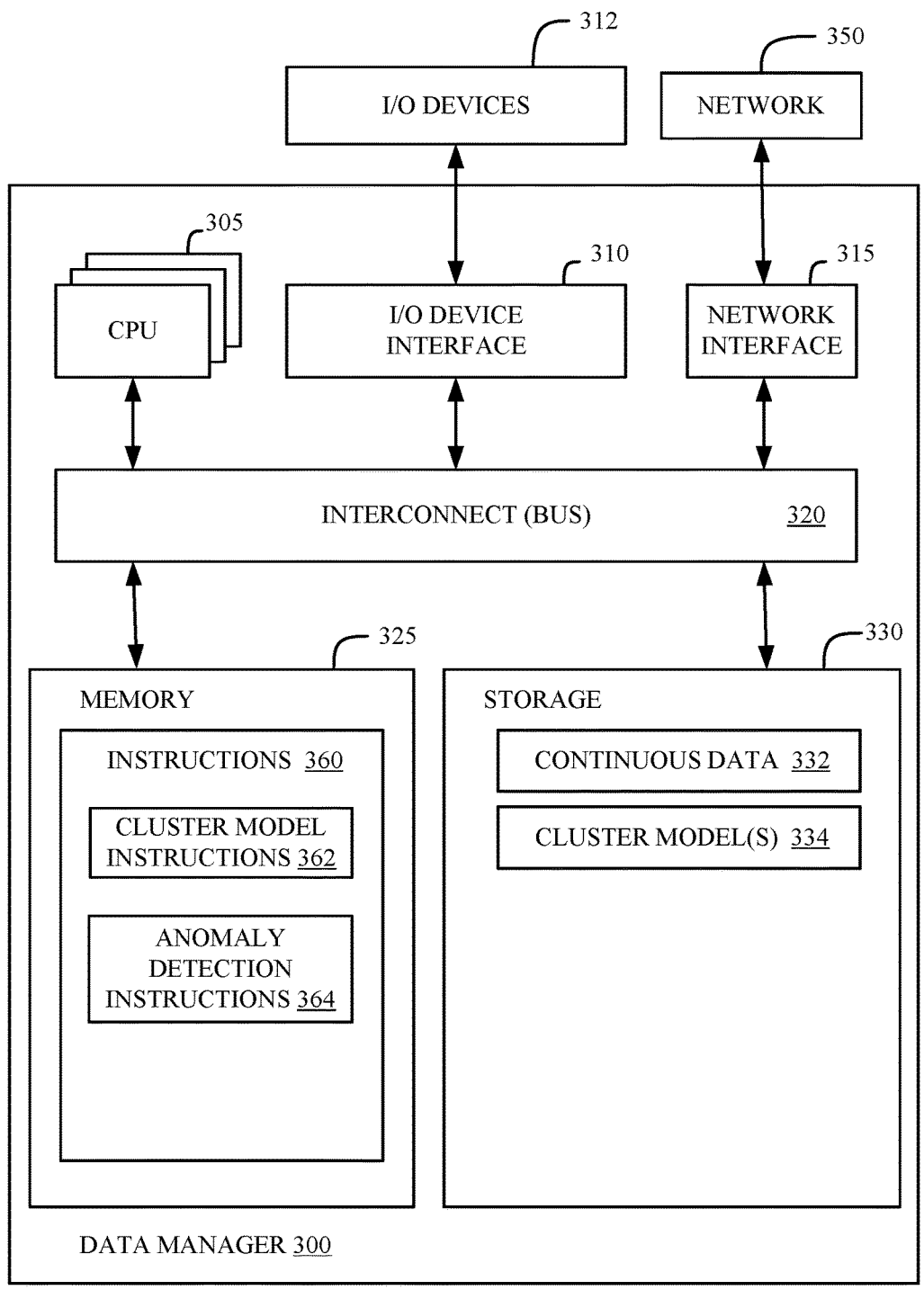
FIG. 3 illustrates a block diagram of a data manager in accordance with some embodiments of the present disclosure.

Referring now to FIG. 3, illustrated is a block diagram of a data manager 300 in accordance with some embodiments of the present disclosure. In some embodiments, the data manager 300 is consistent with data manager 110 of FIG. 1 and/or data manager 210 of FIG. 2. In some embodiments, data manager 300 performs operations in accordance with FIGS. 4-6 as described in further detail hereinafter. The data manager 300 can include a memory 325, storage 330, an interconnect (e.g., BUS) 320, one or more processors 305 (also referred to as CPUs 305 herein), an I/O device interface 310, I/O devices 312, and a network interface 315.

Each CPU 305 retrieves and executes programming instructions stored in the memory 325 or storage 330. The interconnect 320 is used to move data, such as programming instructions, between the CPUs 305, I/O device interface 310, storage 330, network interface 315, and memory 325. The interconnect 320 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., static random access memory (SRAM), dynamic random access memory (DRAM), or Flash). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN) devices, the cloud, or other devices connected to the data manager 300 via the I/O devices 310 or a communication network 350 via the network interface 315.

In some embodiments, the memory 325 stores instructions 360 and the storage 330 stores continuous data 332 and cluster model 334. However, in various embodiments, the instructions 360, the continuous data 332, and the cluster model 334 are stored partially in memory 325 and partially in storage 330, or they are stored entirely in memory 325 or entirely in storage 330, or they are accessed over a network 350 via the network interface 315.

Continuous data 332 can comprise continuous data retrieved from one or more devices, systems, and/or sensors. In some embodiments, continuous data 332 comprises log data generated by one or more computing devices. Continuous data 332 can be retrieved from, for example, database access logs, transaction logs, event logs, message logs, server logs, operations logs (operlogs), or other data retrieved from a custom logger or standard logger (e.g., syslog). In some embodiments, continuous data 332 contains both training data and real-time data. Training data can comprise at least two sets of corresponding continuous data from two consecutive time intervals and can be used to generate cluster model 334 using unsupervised learning. In some embodiments, the time intervals are equal time intervals. In some embodiments, the time intervals are consecutive time intervals. Real-time data can be used to identify anomalous behavior once the real-time data is clustered according to cluster model 334.

Cluster model 334 is one or more models for clustering continuous data 332 using unsupervised learning. Cluster model 334 clusters continuous data 332 based on an appropriate number of clusters and an appropriate temporal stability. Generation of cluster model 334 is described in further detail hereinafter with respect to FIGS. 4-5. Application of cluster model 334 is described in further detail hereinafter with respect to FIG. 6.

The instructions 360 store processor executable instructions for various methods such as the methods shown and described hereinafter with respect to FIG. 4-6. The instructions can include cluster model instructions 362 and anomaly detection instructions 364. Cluster model instructions 362 can include instructions for generating cluster model 334. Cluster model instructions 362 are described in further detail hereinafter with respect to FIGS. 4-5. Anomaly detection instructions 364 can include instructions for applying cluster model 334 in order to identify abnormal fluctuations in continuous data. Anomaly detection instructions 364 are described in further detail hereinafter with respect to FIG. 6.

In various embodiments, the I/O devices 312 can include an interface capable of presenting information and receiving input. For example, I/O devices 312 can receive input from a user and present information to a user interacting with data manager 300.

In some embodiments, the network 350 is consistent with network 100 of FIG. 1 and/or network 200 of FIG. 2. The network 350 can connect (via a physical or wireless connection) the data manager 300 with devices, databases, and/or sensors (e.g., devices 102A-102D, database 104, and/or sensors 202A-202D of FIG. 1) in order to retrieve continuous data.

Figure 4:
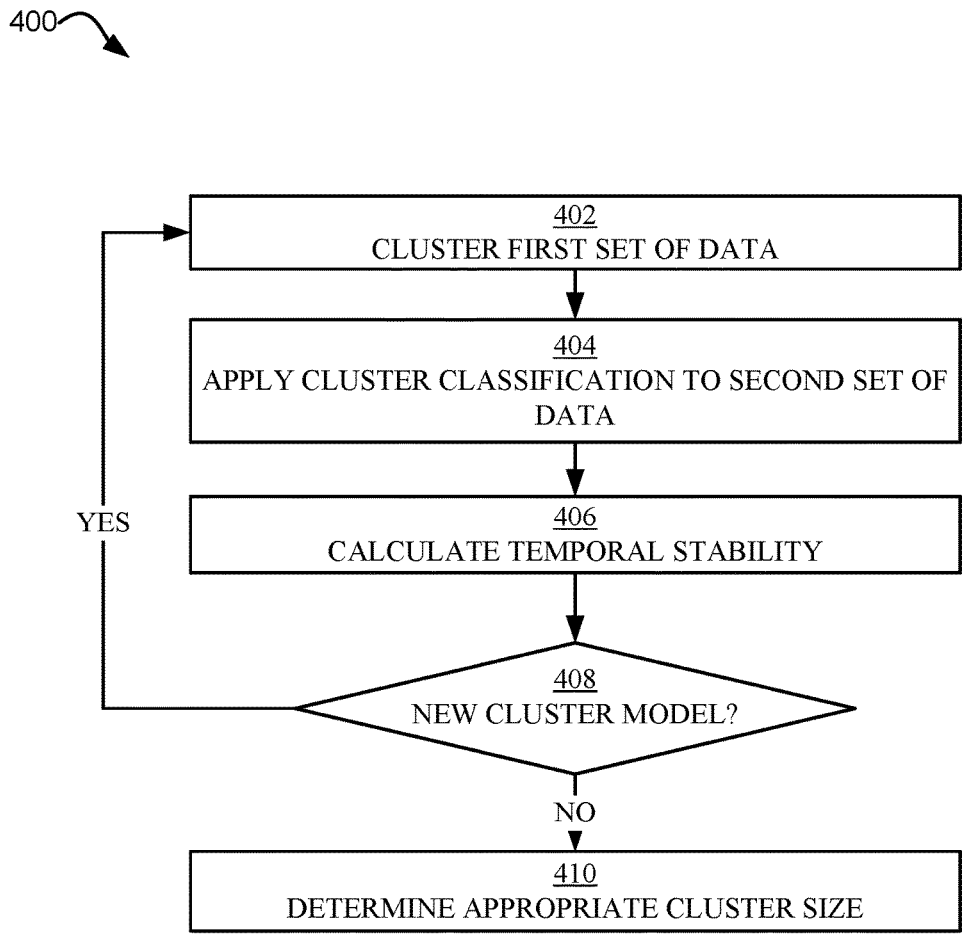
FIG. 4 illustrates a flowchart of an example method for generating a cluster model in accordance with some embodiments of the present disclosure.

FIG. 4 illustrates a flowchart of an example method for generating a cluster model in accordance with some embodiments of the present disclosure. In some embodiments, the method 400 can be implemented by a data manager functioning in a network (e.g., data manager 110 or 210 of FIG. 1 or 2). In some embodiments, the method 400 can be implemented by a processor executing instructions (e.g., processor 305 executing instructions 360 of FIG. 3).

The method 400 generates an appropriate cluster model based on continuous data. Continuous data can be, but is not limited to, continuous data generated by one or more devices, systems, and/or sensors. In some embodiments, continuous data comprises log data generated by computer systems, such as, but not limited to, database access logs, transaction logs, event logs, message logs, server logs, operations logs (operlogs), or other data retrieved from a custom logger or standard logger (e.g., syslog). Advantageously, the method 400 can generate a cluster model based on an appropriate temporal stability between clusters of at least two sets of data retrieved from two times, thereby improving the accuracy of analyses performed on the clustered data compared to data clustered according to spatial metrics and/or data clustered from a single time. In some embodiments, the two times are two approximately equal time intervals. In some embodiments, the two times are two consecutive time intervals.

Aspects of the present disclosure collect a set of data points P collected from at least two time intervals in an N-dimensional metric space for an object group O. At least two sets of data can be used, namely, data from object group O at a first time $t_1$ and data from object group O at a second time $t_2$. A feature vector representing a position of an object i (in object group O) at a time j can be denoted as $p_i^{t_j}$. In embodiments, where the continuous data comprises database log data, feature vectors can be defined according to numerous (e.g., tens, hundreds, or thousands) characteristics of a device or a user profile such as, for example, respective probabilities the user would attempt to read respective data from a respective table in a respective database, respective probabilities the user would attempt to write respective data to a respective table in a respective database, a number of failed database operations, and so on.

The method 400 begins at operation 402 by clustering the first set of data points from first time $t_1$. Thus, operation 402 can calculate cluster centroids $c_k \in C$ and associated Voronoi regions $V_k$. Voronoi regions $V_k$ and cluster centroids $c_k$ can be calculated according to equations known to those skilled in the art.

As discussed in operation 402, aspects of the present disclosure utilize Voronoi regions. Voronoi regions are sub-spaces of a multidimensional space. Each sub-space contains a centroid. The sub-spaces are defined such that every point in a respective sub-space is closer to the centroid of the respective sub-space than any other centroid of any other sub-space. Thus, for a given set of data, the data can be partitioned such that each Voronoi region is associated with a subset of the given set of data. A Voronoi region can be defined according to Equation 1 for any point x in multidimensional space X:

$$V_k = \{x \in X | d(x, c_k) \leq d(x, c_j) \text{ for all } j \neq k\} \quad \text{Equation 1}$$

Operation 404 applies the classification from operation 402 over the second set of data points from the second time $t_2$.

Operation 406 calculates at least one measure of temporal stability between the first set of data and the second set of data. In some embodiments, the temporal stability can include a measurement of cross-cluster movement between Voronoi regions of the first set of data and the second set of data based on the Voronoi regions calculated in operation 402. In some embodiments, the temporal stability can further include a measurement based on individual point movement. Thus, the calculated temporal stability can indicate clustering quality based on both static clusters and/or dynamic clusters. Operation 406 is described in more detail hereinafter with respect to FIG. 5.

Operation 408 determines if additional cluster models should be generated. The method 400 can generate a plurality of cluster models in various embodiments. In embodiments where the method 400 generates multiple cluster models, the method 400 returns to operation 402 and generates a new cluster model by clustering the first set of data using a different number of clusters. The method 400 can generate a pre-selected number of cluster models (e.g., 10), or the method 400 can generate cluster models until a cluster model satisfies one or more temporal stability thresholds (e.g., until a cluster model satisfies a pre-defined temporal stability), or the method 400 can generate cluster models according to another measurement (e.g., until the cluster models converge on an optimal solution). In the event operation 408 determines no additional cluster models are to be generated, the method 400 proceeds to operation 410.

Operation 410 selects an appropriate number of clusters based on the one or more cluster models generated in operations 402-406 by identifying a cluster model with an appropriate number of clusters and an appropriate temporal stability. In some embodiments, operation 410 selects the cluster model having the maximum number of clusters such that the cluster model has an appropriate temporal stability. In some embodiments, an appropriate temporal stability comprises a cross-cluster movement (X) below a first threshold and/or a mean movement distance (Q) below a second threshold. In some embodiments, the appropriate number of clusters are determined based on a cost function that combines one or more measures (e.g., X and/or Q) to determine the appropriate number of clusters. In such embodiments, the one or more respective measures can each be associated with a respective cost, and the appropriate number of clusters can be the number of clusters having the lowest total cost. Respective costs can moderate the importance of the one or more measures and can be based on user input and/or learned from historical data. Cross-cluster movement and mean movement distance are described in further detail hereinafter with respect to FIG. 5.

Although Voronoi regions are discussed above, embodiments of the present disclosure exist that utilize clustering methods that are not centroid-based such as, but not limited to, connectivity-based clustering, distribution-based clustering, and density-based clustering. In such embodiments, the Voronoi region can be replaced by a multi-dimensional outline of the clustered points or a multi-dimensional sphere that is defined by the furthest points in each dimension. In such embodiments, the temporal stability measure (described hereinafter with respect to FIG. 5) can use a majority vote to determine the original cluster classification, and can subsequently use an appropriate normalization factor to measure the distance of objects crossing from one cluster to another cluster.

Figure 5:
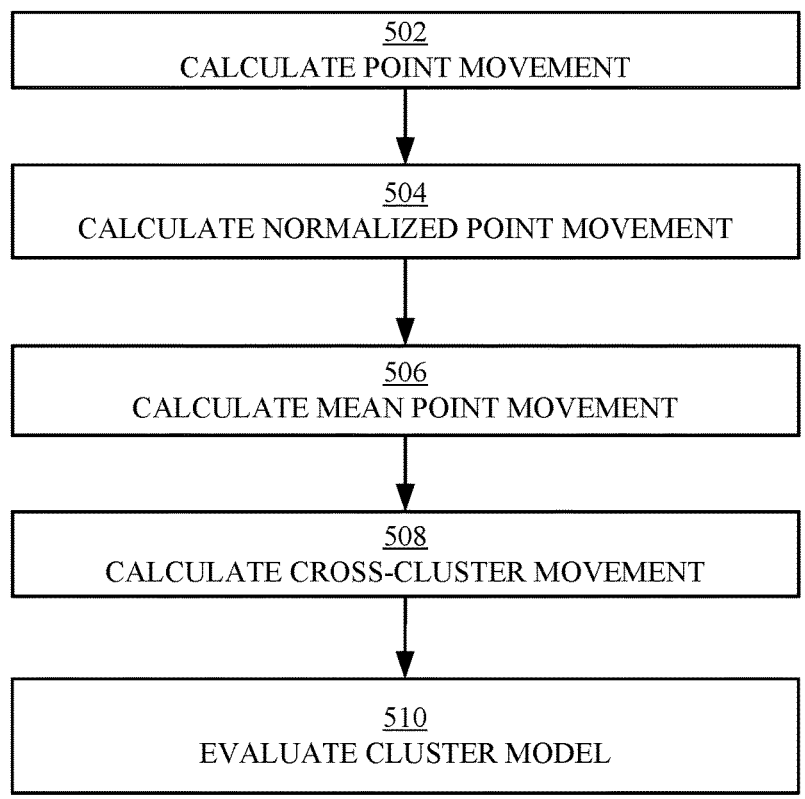
FIG. 5 illustrates a flowchart of an example method for calculating temporal stability between two or more clusters in accordance with some embodiments of the present disclosure.

FIG. 5 illustrates a flowchart of an example method for calculating temporal stability between two or more sets of data in accordance with some embodiments of the present disclosure. In some embodiments, the method 500 can be implemented by a data manager functioning in a network (e.g., data manager 110 or 210 of FIG. 1 or 2). In some embodiments, the method 500 can be implemented by a processor executing instructions (e.g., processor 305 executing instructions 360 of FIG. 3).

The method 500 starts at operation 502 by calculating point movement of the second set of data (e.g., retrieved from the second time $t_2$). Point movement can be defined as the distance d (e.g., minimum distance, maximum distance, Euclidean distance, or any other distance function) between $p_i^{t_2}$ and $V_k$ where $V_k$ refers to the Voronoi region calculated based on the first set of data from the first time $t_1$ and where $p_i$ was classified as part of cluster k. Thus, point movement, $\tilde{m}_i$, can be calculated according to Equation 2:

$$\tilde{m}_i = \min_{\forall v \in V_k} \{d(p_i^{t_2}, v)\} \quad \text{Equation 2}$$

Operation 504 can calculate a normalized point movement in order to account for variance in Voronoi region areas according to Equation 3:

$$m_i = \frac{\tilde{m}_i}{\frac{1}{|o_i \in c_k|} \Sigma_{o_i \in c_k} d(p_i, c_k)} \quad \text{Equation 3}$$

Operation 506 can calculate the mean movement distance for all objects in a set of objects O where $|O|=S$ as shown in Equation 4:

$$Q = \frac{1}{S} \sum_{i=1}^{S} m_i \quad \text{Equation 4}$$

In Equation 4, Q can be referred to as the mean movement distance, the average normalized point movement, or the temporal clustering quality index. In some embodiments, Q can quantify how much respective data points shifted from the original boundaries of the cluster.

Operation 508 computes cross-cluster movement. Cross-cluster movement can be based on data points that move from one Voronoi region (based on the first set of data) to a different Voronoi region (based on the second set of data). For example, if classification of respective points in O at time $t_1$ is denoted as $CO_1=\{co_1^1, co_2^1, \ldots co_n^1\}$ and classification of respective points in O at time $t_2$ is denoted as $CO_2=\{co_1^2, co_2^2, \ldots co_n^2\}$, then cross-cluster movement can be denoted as X and defined by Equation 5:

$$X \triangleq \left| \bigcup_{i=1}^{S} co_i^1 \oplus co_i^2 \right| \quad \text{Equation 5}$$

In Equation 5, the circled plus operator can act as an exclusive OR function. In some embodiments, Equation 5 identifies objects which appear only at $co_i^1$ or $co_i^2$. In such embodiments, a union of the resulting sets can then be defined, and its size can be associated with the measure X. As will be appreciated by one skilled in the art, other measures can also be used as part of defining a temporal stability measure (e.g., taking the number of non-empty resulting sets). In some embodiments, a higher X-measurement indicates a higher degree of cross-cluster movement.

It is particularly noted that aspects of the present disclosure thus account for both static clusters and dynamic clusters (e.g., using, alone or in combination, Q and/or X). Thus, aspects of the present disclosure more accurately quantify temporal stability between two sets of clustered data.

Operation 510 evaluates the cluster model based on one or more measurements calculated in operations 502-510. In some embodiments, operation 510 compares the temporal clustering quality index Q (as described in Equation 4) and/or the cross-cluster movement X (as described in Equation 5) to one or more thresholds. In embodiments utilizing both measurements, the appropriate number of clusters can correspond to the model having the appropriate number of clusters and appropriate Q and X measurements as shown in Equation 6:

$$\operatorname{argmax}_C \text{ClusterModel}(P) \text{ such that } Q<T_1 \text{ and } X<T_2. \quad \text{Equation 6}$$

Thus, Equation 6 can select the cluster model having the appropriate number of clusters such that the cluster model satisfies parametric thresholds $T_1$ and $T_2$. Parametric thresholds $T_1$ and $T_2$ can be used to moderate a susceptibility to outliers and inclusiveness of normal fluctuations within the data. For example, lower thresholds $T_1$ and/or $T_2$ could incorrectly identify a normal fluctuation in data as a temporal instability, whereas a higher threshold $T_1$ and/or $T_2$ could incorrectly characterize a temporal instability event as a normal fluctuation in data. Parametric thresholds $T_1$ and/or $T_2$ can be defined based on any number of factors or combinations of factors, including historical data and user input.

In some embodiments, operation 510 optimizes a cluster model according to one or more measurements (e.g., Q and/or X) as shown in Equation 7:

$$\operatorname{argmax} F(\text{ClusterModel},Q,X) \quad \text{Equation 7}$$

As shown in Equation 7, F can denote a cost function that incorporates the cluster model and Q and X. The term ClusterModel can refer to a state of the art single time point cluster evaluation such as, but not limited to, Davis-Bouldin, Calinski-Harabasz, and/or the Silhouette method. In some embodiments, Equations 6 and/or 7 are configured to select the model utilizing the largest number of clusters and satisfying the respective equation.

Alternative variations exist to the methods described above. As one example of a generic centroid-based clustering strategy, the methods 400 and 500 can identify the best K for K-means clustering by running K-means for a plurality of K choices and selecting an appropriate K based on an internal measure (e.g., David-Bouldin) and limiting the K choices using the two constraints. Alternatively, an appropriate K can be identified by running K-means for multiple K values and using a Pareto front of multiple scores (including cross-cluster movement X) to identify an appropriate K.

Figure 6:
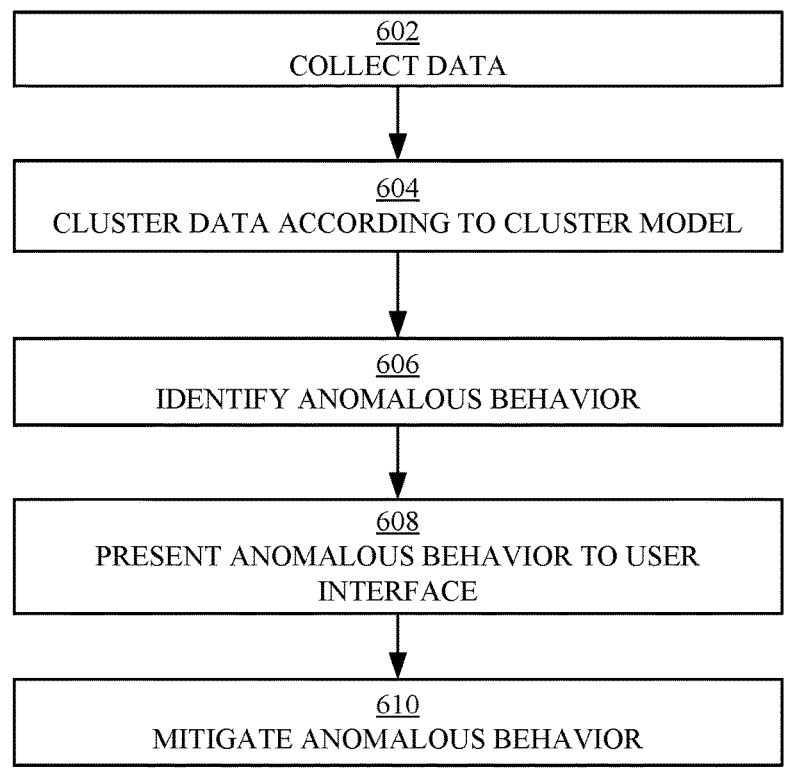
FIG. 6 illustrates a flowchart of an example method for using a cluster model in accordance with some embodiments of the present disclosure.

FIG. 6 illustrates a flowchart of an example method for using a cluster model in accordance with some embodiments of the present disclosure. The method 600 can be implemented by a data manager functioning in a network (e.g., data manager 110 or 210 of FIG. 1 or 2). The method 600 can likewise be implemented by a processor executing instructions (e.g., processor 305 executing instructions 360 of FIG. 3).

The method 600 begins at operation 602 by collecting continuous data. The continuous data can be, but is not limited to, continuous data generated by one or more devices, systems, and/or sensors. In some embodiments, continuous data comprises log data generated by computer systems, such as, but not limited to, database access logs, transaction logs, event logs, message logs, server logs, operations logs (operlogs), or other data retrieved from a custom logger or standard logger (e.g., syslog) log data.

Operation 604 clusters the collected data according to a cluster model (e.g., the cluster model selected in operation 410 of FIG. 4) by clustering the data collected in operation 602 into an appropriate number of clusters.

Operation 606 identifies anomalous behavior in the clustered data. Anomalous behavior can be identified based on any number of techniques. In some embodiments, anomalous behavior can be based on differences between the clustered data and the cluster model and/or based on differences between the clustered data and a previously clustered set of data. For example, the data collected in operation 602 and clustered in operation 604 can exhibit temporal variability indicating anomalous behavior. In some embodiments, the temporal variability is measured using Q and/or X as discussed before, where the data collected in operation 602 represents a second set of data, and data collected in a previous interval (e.g., the sequentially previous interval of equal length as the interval from which the data collected in operation 602 was retrieved) represents a first set of data. In some embodiments, anomalous behavior is identified when Q is above the first threshold $T_1$ and/or when X is above the second threshold $T_2$.

In some embodiments, operation 606 identifies anomalous behavior using techniques independent from the techniques used to cluster the data according to the cluster model. Thus, operation 606 can identify anomalous behavior according to a measurement unrelated to Q and/or X.

Operation 608 can present the anomalous behavior identified in operation 606 to a user interface (e.g., user interface 114 or 214 of FIGS. 1 and 2, or I/O devices 312 of FIG. 3). The anomalous behavior can be presented in any number of ways including, but not limited to, a graph, a bar chart, a warning, or a different infographic. The indication of anomalous behavior can be a general indication (e.g., a warning that the clustered data is acting abnormally) or a precise indication (e.g., a warning that one or more particular data points within the clustered data are acting abnormally).

Operation 610 can mitigate the anomalous behavior. For example, the anomalous behavior could be consistent with unauthorized access to confidential data in a database. Operation 610 could, responsive to identifying the anomalous behavior in operation 606, automatically restrict access to the database. In some embodiments, operation 610 is optional, and occurs (if it occurs at all) responsive to user input to a user interface that authorizes such mitigation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
   receiving a first set of data from a first log of a first database for a first time and a second set of data from a second log of the first database for a second time;
   clustering the first set of data into a first number of clusters;
   determining a cross-cluster movement and an average normalized point movement based on the second set of data and the clustered first set of data;
   determining the first number of clusters is an appropriate number of clusters based on the cross-cluster movement being less than a first threshold and the average normalized point movement being less than a second threshold, wherein the first number of clusters is a maximum number of clusters having the cross-cluster movement less than the first threshold and the average normalized point movement less than the second threshold;
   clustering a new set of data according to the first number of clusters, wherein the new set of data comprises a third log of the first database for a third time;
   identifying an anomalous behavior in the new set of data based on a second cross-cluster movement being above the first threshold and a second average normalized point movement being above the second threshold; and
   mitigating the anomalous behavior by restricting access to the first database.

2. The method according to claim 1, wherein the first set of data is clustered based on Voronoi regions, and wherein cross-cluster movement is based on differences in Voronoi regions for corresponding data points from the first set of data and the second set of data.

3. The method according to claim 1, wherein determining the first number of clusters is an appropriate number of clusters further comprises:
   clustering the first set of data according to a first number of clusters by generating a first set of Voronoi regions such that at least a first Voronoi region is associated with a first centroid and a first subset of the first set of data, wherein respective data points of the first subset are closer to the first centroid than any other centroid of any other Voronoi region of the first set of Voronoi regions.

4. The method according to claim 3, wherein determining the first number of clusters is an appropriate number of clusters further comprises:
   applying classifications of the clustered first set of data to the second set of data; and
   calculating cross-cluster movement by identifying at least data points of a second subset of the second set of data corresponding to data points in the first subset that are not associated with the first Voronoi region.

5. The method according to claim 3, wherein the average normalized point movement is based on an average normalized distance between at least a second subset of the second set of data and the first centroid, wherein the second subset comprises data points corresponding to the first subset.

6. The method according to claim 5, wherein determining the first number of clusters is an appropriate number of clusters further comprises:
   calculating a respective minimum distance for each respective point of at least the second subset to the first centroid;
   calculating a normalized respective minimum distance for at least each point of the second subset by dividing each respective minimum distance by an average distance between respective points of the second subset and the first centroid; and
   calculating an average normalized point movement for the second set of data by summing the normalized respective minimum distances for data points in the second set of data and dividing by a number of data points in the second set of data.

7. The method according to claim 1, wherein the first time and the second time are consecutive intervals of equal time.

8. A system comprising:
   a data manager comprising a memory and a processor communicatively coupled to a user interface and a first database, wherein the data manager performs operations comprising:
   receive a first set of data from a first log of the first database for a first time and a second set of data from a second log of the first database for a second time;
   cluster the first set of data into a first number of clusters;
   determine a cross-cluster movement and an average normalized point movement based on the second set of data and the clustered first set of data;
   determine the first number of clusters is an appropriate number of clusters based on the cross-cluster movement being less than a first threshold and the average normalized point movement being less than a second threshold, wherein the first number of clusters is a maximum number of clusters having the cross-cluster movement less than the first threshold and the average normalized point movement less than the second threshold, and wherein cross-cluster movement is based on changes in cluster classification for corresponding data points from the first set of data and the second set of data;
   cluster a new set of data according to the appropriate number of clusters, wherein the new set of data comprises a third log of the first database for a third time;
   identify an anomalous behavior in the new set of data based on a second cross-cluster movement being above the first threshold and a second average normalized point movement being above the second threshold; and
   mitigate the anomalous behavior by restricting access to the first database.

9. The system according to claim 8, wherein to determine an appropriate number of clusters the data manager performs operations of:

cluster the first set of data according to a first number of clusters by generating a first set of Voronoi regions such that at least a first Voronoi region is associated with a first centroid and a first subset of the first set of data, and wherein each data point of the first subset is closer to the first centroid than any other centroid of the first set of Voronoi regions.

10. The system according to claim 9, wherein to determine an appropriate number of clusters the data manager performs operations of:
apply classifications of the clustered first set of data to the second set of data; and
calculate cross-cluster movement by identifying at least data points of a second subset of the second set of data corresponding to data points in the first subset that are not associated with the first Voronoi region.

11. The system according to claim 9, wherein the average normalized point movement is based on an average normalized distance between at least a second subset of the second set of data to the first centroid, wherein the second subset comprises data points corresponding to data points of the first subset.

12. The system according to claim 11, wherein to determine an appropriate number of clusters the data manager performs operations of:
calculate a respective minimum distance for each respective point of at least the second subset to the first centroid;
calculate a normalized respective minimum distance for at least each point of the second subset by dividing each respective minimum distance by an average distance between respective points of the second subset and the first centroid; and
calculate an average normalized point movement for the second set of data by summing the normalized respective minimum distances of the second set of data and dividing by a number of data points in the second set of data.

13. The system according to claim 8, wherein the first time and the second time are consecutive intervals of equal time.

14. A computer program product comprising a computer readable storage medium having program instructions embodied therewith, wherein the computer readable storage medium is not a transitory signal per se, the program instructions executable by a processor to cause the processor to perform a method comprising:
receiving a first set of training log data from a first database for a first time and a second set of training log data from the first database for a second time;
partitioning the first set of training log data into a plurality of clusters having a first number of clusters and a respective centroid corresponding to each cluster, wherein respective data points in a given cluster are closer to a respective centroid of the given cluster than any other centroid of any other cluster;
determining a cross-cluster movement and an average normalized point movement based on the second set of training log data and the clustered first set of training log data;
determining the first number of clusters is an appropriate number of clusters based on the cross-cluster movement being below a first threshold and the average normalized point movement being below a second threshold, wherein the first number of clusters is a maximum number of clusters having the cross-cluster movement less than the first threshold and the average normalized point movement less than the second threshold;
clustering a new set of log data according to the appropriate number of clusters, wherein the new set of log data is from the first database for a third time;
identifying an anomalous behavior in the new set of log data based on a second cross-cluster movement being above the first threshold and a second average normalized point movement being above the second threshold; and
mitigating the anomalous behavior by restricting access to the first database.

15. The computer program product according to claim 14, wherein the program instructions causing the processor to partition the first set of training log data and the second set of training log data further cause the processor to perform a method further comprising:
clustering the first set of training log data according to the first number of clusters by generating a first set of Voronoi regions such that at least a first Voronoi region is associated with a first centroid and a first subset of the first set of training log data.

16. The computer program product according to claim 15, wherein the program instructions causing the processor to determine the first number of clusters is an appropriate number of clusters further cause the processor to perform a method further comprising:
applying classifications of the clustered first set of training log data to the second set of training log data; and
calculating cross-cluster movement by identifying at least data points of a second subset of the second set of training log data corresponding to data points in the first subset that are not associated with the first Voronoi region.

17. The computer program product according to claim 15, wherein the average normalized point movement is based on distances between at least a second subset of the second set of training log data and the first centroid, wherein the second subset comprises data points corresponding to data points of the first subset.

18. The computer program product according to claim 17, wherein the program instructions causing the processor to determine the first number of clusters is an appropriate number of clusters further cause the processor to perform a method further comprising:
calculating a respective minimum distance for each respective point of at least the second subset to the first centroid;
calculating a normalized respective minimum distance for at least each point of the second subset by dividing each respective minimum distance by an average distance between respective points of the second subset and the first centroid; and
calculating an average normalized point movement for the second set of training log data by summing the normalized respective minimum distances and dividing by a number of data points in the second set of training log data.

19. The computer program product according to claim 14, wherein the program instructions further cause the processor to perform a method further comprising:
presenting, on a user interface, an indication of the anomalous behavior in the new set of log data.

* * * * *